Sept. 24, 1940. H. G. WEBER ET AL 2,215,518
MACHINE AND METHOD OF MAKING MULTIPLY NONSIFTING BAGS
Filed Dec. 31, 1938 9 Sheets-Sheet 1

Inventors
Herman G. Weber
Herbert H. Weber
By Charles R. Wills Attys.

Sept. 24, 1940.   H. G. WEBER ET AL   2,215,518
MACHINE AND METHOD OF MAKING MULTIPLY NONSIFTING BAGS
Filed Dec. 31, 1938   9 Sheets-Sheet 5

Patented Sept. 24, 1940

2,215,518

UNITED STATES PATENT OFFICE 2,215,518

MACHINE AND METHOD OF MAKING MULTIPLY NONSIFTING BAGS

Herman G. Weber and Herbert H. Weber, Sheboygan, Wis., assignors to H. G. Weber & Company, Inc., Kiel, Wis., a corporation of Wisconsin Application December 31, 1938, Serial No. 248,664

6 Claims. (Cl. 93—33)

This invention relates to a machine for the manufacture of paper bags having square bottoms and which are known in the trade as "satchel bottom bags" and "self-opening bags," the difference between the two types of bags being in the way in which they are folded. The self-opening bags are folded with their two norrow sides formed into accordion pleats lying between the other two sides, which enable the bags to be opened merely by being quickly jerked through the air. The satchel bottom bags are merely folded flat so that it is necessary to use both hands in opening the bag, one hand being inserted within it to spread the sides apart and push the bottom into shape.

The bottoms of bags of this general type, whether they are of the self-opening variety or of the plain satchel bottom variety, are formed in the front and back and sides of the bag and pasting the folded-in parts on top of each other as shown, for example, in the U. S. patent to Weber No. 1,571,983. The resulting bag bottom has diagonal folds extending in from each corner, and the inner ends of these folds are not sealed by the pasted-over portion of the bottom. Thus, when the bag is filled with finely powdered material, it is possible for a portion of the contents of the bag to sift along the folds and to escape from the bag. The material which sifts through the bottom of the bag is generally lost and its presence outside of the bag is objectionable from the standpoint of cleanliness. It is, therefore, extremely desirable to provide a sift-proof bag for containing finely powdered material.

We have discovered two commercially practical ways of making a sift-proof bag with a rectangular bottom of the general type described above. One method consists in applying paste to the inside of the diagonal folds along which sifting would otherwise occur, and thus sealing off the passage along this fold. The other method comprises making the bag out of two or more plies of paper and in cutting and folding these plies in forming the bottom of the bag so that flaps formed from the outer ply will be pasted over the ends of the above mentioned diagonal folds of the inner ply, thus sealing off the ends of these folds. Each of these two ways of making a sift-proof bag may be employed by itself, or the two may be employed simultaneously on the same bag, thus making a doubly sift-proof bag. It may be readily seen that, by employing one or the other or both methods of making a bag sift-proof and applying them to either the self-opening bag or to the plain satchel bottom bag, many different varieties of sift-proof bags may be produced.

One of the principal objects of this invention is to provide a machine for automatically making the sift-proof bags described above.

Another object of the present invention is to provide a single machine which can be readily adjusted to make any one of the various possible types of sift-proof bags.

Another object of the present invention is to provide a machine which will not only make a bag with a sift-proof bottom but which will also fix the top of the bag so that it may readily be sealed in a way which will make it as sift-proof as the bottom.

Another object of the present invention is to provide a paper bag forming machine which will operate with more plies of or with thicker paper than previous machines. The machines in use at the present time are limited in the total thickness of paper with which they will operate, and therefore the strength of the bag which they can make is limited, by the mechanism for cutting the continuous webs or strips of paper into separate pieces to form the separate bags. It is, therefore, more particularly an object of the present invention to provide a paper bag making machine having improved paper cutting mechanism which will operate through a greater number of plies or a greater total thickness of paper than the mechanisms previously known and which will operate at the high speed required by modern paper bag making machinery.

Another object of this invention is to provide a simple mechanism for producing the longitudinal slits which define the sides of the last flaps to be pasted down in forming the bottom of a paper bag.

Another object of this invention is to provide a longitudinal slit-cutting mechanism which not only can be readily adjusted to cut slits laterally separated from each other at different distances for different sizes of bags, but which can also be readily adjusted to cut slits of different lengths, as is also required for bags of different sizes, and also to cut slits both for forming the bottom of the bag and for permitting the top of the bag to be folded down and sealed in the same manner as the bottom after the bag is filled.

A further object of this invention is to provide a bag forming machine adapted to form bags of two or more plies of paper and having separate slitting mechanisms for slitting each ply so that the slits in the different plies may be at different distances apart.

Another object of this invention is to provide several improved methods of making sift-proof paper bags.

Another object of the present invention is to provide a method of making an improved two-ply sift-proof bag which, when the top has been sealed on a standard bag-sealing machine after the bag is filled, will be sift-proof at the top as well as at the bottom.

Another object of the present invention is to provide a method of making sift-proof bags which will be applicable to single-ply bags as well as to multiply bags.

The novel features which we believe to be characteristic of our invention are set forth with particularity in the appended claims. Our invention itself, however, both as to its organization and manner of construction, together with further objects and advantages thereof, may best be understood by reference to the following description taken in connection with the accompanying drawings, in which:

The complete machine embodying the invention comprises a first portion which takes paper in one or more continuous strips from one or more rolls, forms it into a paper tube, and cuts this tube into lengths, each of which will form one bag, and a second portion which takes the blanks thus formed and which folds and pastes one end of each bag to form a bag bottom. The second portion of the complete machine, that which forms the bottom of the bags, may be conventional in its construction and operation.

being made, for example, as shown in U. S. patent to H. G. Weber 1,571,983. The entire novelty in the present invention lies in the first portion of the complete machine, that portion which forms the paper into a tube and cuts it into individual bag blanks. The following description, therefore, is limited to the first portion of the machine in which the novelty resides.

Figure 26:
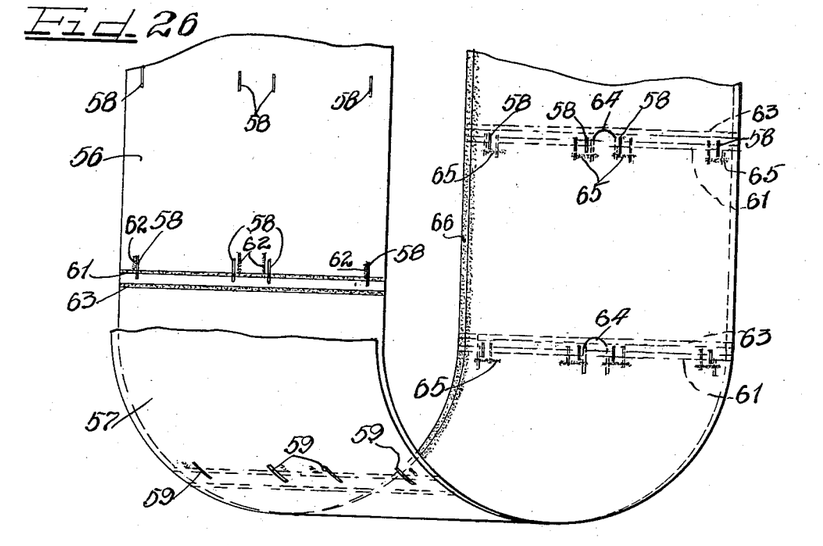
Figure 26 is a perspective view of portions of two continuous webs of paper placed together, as they would be in making a two-ply bag, showing the various operations which the machine can perform on the paper prior to its folding.

The embodiment of the invention shown in the drawings may be regarded as being composed of three portions mounted upon different parts of the frame 51, 52 and 53, and each arranged to perform certain steps in the formation of a paper bag blank. The first portion of the machine, that mounted upon the first part 51 of the frame, carries two or more rolls of paper 54 and 55, unrolls the paper from these rolls, cuts the longitudinal slits in each sheet of paper at the proper point for the formation of the future bottom of the bag, applies paste for sticking the two sheets together, makes a small semicircular cut, known as the thumb cut, in the two sheets of paper, applies lines of paste on the side of the paper which will form the inside of the bag and in the proper position to seal the diagonal folds of the bottom, and applies a line of paste along one edge of the two sheets. The result of these operations is shown in Figure 26 which shows the sheet of paper 56 which forms the inside of the bag, the sheet of paper 57 which forms the outside of the bag, the longitudinal slits 58 in the inner sheet of paper 56, the longitudinal slits 59 in the outer sheet of paper 57, the lines of paste 61 and 62 for sticking the two sheets of paper 56 and 57 together at the bottom of the bag, the line of paste 63 for sticking the two sheets of paper 56 and 57 together at the top of the bag, the semicircular thumb cut 64, the lines of paste 65 on the inner surface of the paper for sealing the diagonal folds in the bottom of the bag, and the lines of paste 66 along one edge of the two sheets for securing their edges together when the paper tube for the bag blank is formed.

Figure 27:
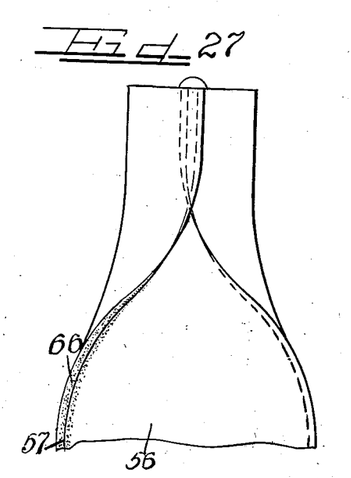
Figure 27 is a plan view showing how the two superimposed webs of paper are folded to form a flat paper tube for the making of satchel-bottom bags.

The portion of the machine carried by the second part 52 of the frame receives the two-ply sheet of paper from the first part of the machine and folds it into a continuous paper tube. The result of this operation is shown in Figure 27 in which, at the bottom of the figure, the two plies of paper 56 and 57 are flat and, at the top of the figure, are formed into a tube with the edge of the two plies carrying the line of paste 66 folded down over and stuck to the other edge of the two plies. It may be seen in this figure that the two plies 56 and 57 do not lie exactly on top of each other, but that one ply 57 projects a little at one edge and the other ply 56 projects a little at the other edge, and that the line of paste 56 lies partly on the projecting edge of one ply and partly on the edge of the other ply beyond which the first ply projects. Thus, when the two plies are folded into a tube, each ply will have its two edges secured together.

Figure 28:
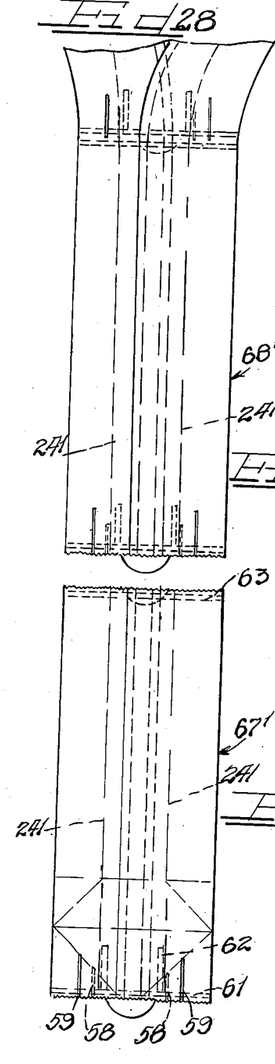
Figure 28 is a plan view showing how a paper tube with side folds is cut into blanks for making self-opening bags.

The third part of the machine, that part mounted upon the third part 53 of the frame, cuts into separate bag blanks the paper tube formed in the first and second parts of the machine. The result of this operation is shown in Figure 28 which shows a complete bag blank 67 cut off from the end of the paper tube 68.

The part of the machine mounted upon the first part 51 of the frame and which prepares the two plies of paper 56 and 57 to be formed into a paper tube comprises two sets of brackets 69 and 71 which carry the rolls of paper 54 and 55 at one end of the machine. The continuous sheet of paper 56 from the upper roll 54 is guided through the first portion of the machine by a series of rolls 72, 73, 74, 75, 76, 77 and 78 extending across the machine and carried by the frame 51. The continuous sheet of paper 57 from the lower roll 55 is similarly guided by three rolls 79, 80 and 81 arranged to define a path for the paper which is different from the first portion of the path of the upper sheet of paper 56. From the last of the three rolls 79, 80 and 81 which guide only the lower sheet of paper 57, the lower sheet joins the upper sheet at the roll 75, and from there on the two sheets 56 and 57 travel together over the rolls 76, 77 and 78.

One of the most important features of this invention is the means which are provided for slitting each of the two plies or sheets of paper 56 and 57 separately before the two plies come together at the roll 75. Two separate slitting devices 82 and 83 are provided. One of these 82 is located between the first and second rolls 72 and 73 which guide the sheet of paper 56 from the upper roll of paper 54 and the other slitting device 83 is located between the first and second rolls 79 and 80 which guide the sheet of paper 57 from the lower roll of paper 55. Except in the way in which they are adjusted and, if desired, in the number of cutters carried by them, the two slitting devices 82 and 83 are identical so that a detailed description of the upper one 82, for example, will serve to explain both of them.

The slitting device 82 comprises a rock shaft 84 extending across the machine adjacent the path of the upper sheet of paper 56 and carried by bearings on the frame 51. The rock shaft 84 carries two knife carriers 85 which are clamped to it by means of bolts 86 so that they can be adjusted both angularly and longitudinally on the shaft 84. Each knife carrier 85 is provided with a knife 87 secured to it by a bolt 88 and lying in a plane perpendicular to the paper and parallel to its direction of travel. The rock shaft 84 has a lever 89 keyed to one end by means of which the knives 87 carried by the shaft are swung into or back away from the path of the paper. One arm of the lever 89 carries a roller 91 which bears upon the periphery of a cam 92, 93 and which is held in contact therewith by means of a spring 94 connected to the other arm of the lever 89. The major portion of the cam 92, 93 is of uniform radius and holds the knife 87 out of contact with the paper, but a small segment has a shorter radius which provides a depression 95 on the periphery of the cam for allowing the knives 87 to swing forward into the path of the paper.

Figures 3, 4, 5, 6:
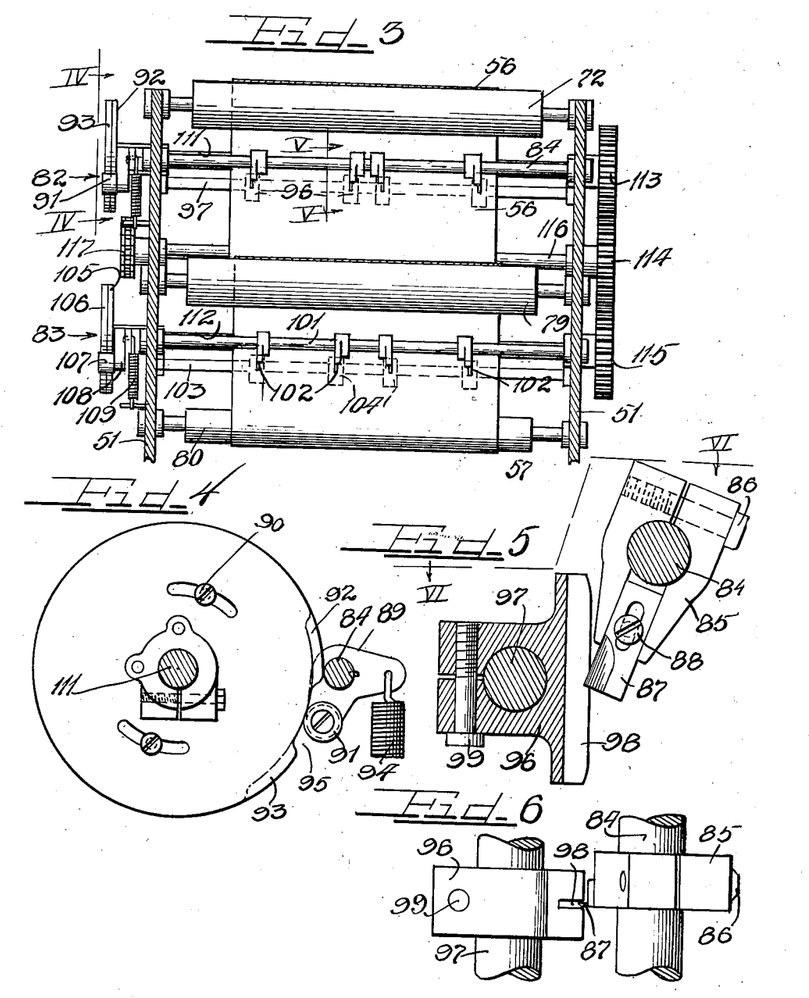
Figure 3 is a cross section on the line III—III of Figure 2, looking in the direction of the arrows.
Figure 4 is an end view of the portion of the mechanism shown in Figure 3 as seen from the line IV—IV and looking in the direction of the arrows.
Figure 5 is a section through a portion of the apparatus shown in Figure 3, the section being taken on the line V—V and looking in the direction of the arrows.
Figure 6 is a plan view of the mechanism shown in Figure 5 as seen from the line VI—VI and looking down in the direction of the arrows.

In order to adjust the length of time during which the knives 87 are swung forward into operative position and to thereby adjust the length of cut made by the knives, the cam 92, 93 is constructed so that the length of the depression 95 in its periphery may be adjusted. This construction comprises making the cam 92, 93 out of two separate plate-like members 92 and 93 secured together by studs 90 passing through arcuate slots in one of the plates. Each of the plates 92 and 93 forming the cam is generally circular but has a portion of its periphery whose radius is less than the radius of the remainder. When the two plates 92 and 93 are clamped together as shown in Figure 4, the portions of the two plates of smaller radius will be partly in register and thus provide the depression 95 on the periphery of the cam. The length of the depression 95 can obviously be adjusted by adjusting the two plates 92 and 93 angularly with respect to each other, for one end of the depression is determined by one plate 92 and the other end of the depression is determined by the other plate 93.

In order to insure the accurate cutting of the slits in the paper by the knives 87, the paper is backed up behind the knives by means of shoes 96 carried by a rod 97 extending across the frame. Each shoe is provided with a slot 98 into which the end of the knife 87 may project, and it is secured in the proper position along the rod 97 by means of a clamping screw 99.

The lower slitting device 83 is constructed in the same manner as the upper slitting device 82 and comprises a rock shaft 101 carrying the necessary number of knives 102, a rod 103 carrying shoes 104 for backing up the paper behind the knives, a two-piece cam 105, 106 for timing the rocking movement of the rock shaft 101 and the knives 102 through a roller 107 carried on a lever 108 fixed to the rock shaft, and a spring 109 for holding the lever 107 against the periphery of the cam 105, 106.

The two cams 92, 93 and 105, 106 for the upper and lower slitting devices 82 and 83 are carried by shafts 111 and 112 which extend across the machine. The two cam shafts 111 and 112 are driven in the proper timed relation by gears 113, 114 and 115 from a cross shaft 116, which, in turn, is driven by a chain 117 which also drives the other mechanism in the first portion of the machine.

From the above description it will be seen that the slitting devices 82 and 83 are adjustable so that slits may be cut at any desired point laterally of the paper and so that the slits may be of any length desired. It may also be seen that, by adjusting the cams 92, 93 and 105, 106, the length of the slits may be varied. Also the number of slits in each ply may be varied by adding or removing knives from the slitting mechanism. As illustrated in Figure 3, the slitting mechanism is set up to produce the four slits 58 in the inner ply and the four slits 59 in the outer ply as shown in Figure 26.

*Inter-ply pasting mechanism*

Before the two sheets of paper 56 and 57 or plies are brought together, it is necessary to apply paste to at least one of them to stick them together and prevent their separating during the formation of the bottom of the bag or, after the bag is completed, when the bag is in use. This is accomplished by means of an inter-ply pasting mechanism 121 shown in Figures 2, 9, 10 and 11. This mechanism is located under the last roller 74 under which the upper ply or sheet 56 passes before joining the lower ply or sheet 57 and comprises two shafts 122 and 123 geared together and driven by a sprocket 124 which engages the main drive chain 117.

The upper shaft 122 of the paste applying device or mechanism 121 is provided with arms 125 and 126 carrying two paste applying bars 127 and 128. The paste applying bars 127 and 128 are carried at such a distance from the shaft 122 that they will press against the under side of the upper sheet of paper 56 as the shaft is rotated and will also swing around and into contact with a paste transfer drum 129 carried on the lower shaft 123. The drum 129 revolves with its lower portion in a paste box 131, so that its surface is always covered with paste and thus coats the paste applying surfaces of the bars 127 and 128 with paste each time that these bars are carried around by the shaft 122.

The paste bars 127 and 128 apply the two transverse lines of paste 61 and 63 shown in Figure 26 which secure the two plies of paper to each other at each end of the bag blank. Means are also provided to apply the two longitudinal lines of paste 62 which lie between the longitudinal slits 58 and serve to paste together along their sides, the two plies of the last flap to be folded over in making the bottom of the bag. This means comprises a pair of arcuate paste bars 130 secured at right angles to the paste bar 127 which applies the line of paste 61 for the bottom of the bag.

*Thumb cut device*

A device 132 is located along the path of the two plies 56 and 57 immediately beyond the roller 75 at which the two plies are brought together and caused to adhere to each other by means of the paste applied to one of them. The device for producing the thumb cut is shown in detail in Figures 12 to 16 and comprises a shaft 133 extending across the machine and driven through gears 134 and a sprocket 135 from the main drive chain 117 shown in Figure 1. Journaled on the thumb cut shaft 133 is a loose collar 136 provided with an approximately radially extending arm 137 which carries a radially projecting semi-cylindrical knife 138. The loose collar 136 is confined against endwise movement along the shaft 133 by two collars 139 and 141 fixed to the shaft 133 by set screws 142. Besides locating the loose collar 136 edgewise, one of the fixed collars 141 carries a stop 143 which locates the loose collar 139 and the knife 138 angularly with respect to the shaft 133, and the other collar 139 serves as an anchorage for a spring 144 which holds the arm 137 against the stop 143. The sizes of the gears 134 and the sprocket 135 which drive the shaft 133 are such that the cutting end of the knife 138 which moves at a linear speed which is a trifle greater than the linear speed of the paper engaged by the knife. When the knife 138 engages the paper, it will be slowed down by the paper and move at exactly the same speed as the paper during the short period with which it is in engagement with it. The slowing down of the knife is permitted by the fact that it is connected to the shaft 133 through the spring 144. Thus, during the time when the knife 138 is piercing the paper, it will move at exactly the same speed as the paper and will not tear it. As soon as the knife is withdrawn from the paper, the spring 144 will snap it forward against the stop 143 so that the next cut will be started at exactly the proper point on the paper.

Figure 16:
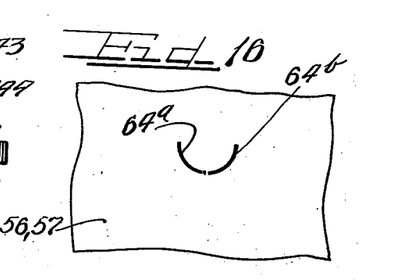
Figure 16 is an elevation of a part of a web of paper to be formed into paper bags after it has been cut by the portion of the apparatus shown in Figures 12 to 15.
Figure 17:
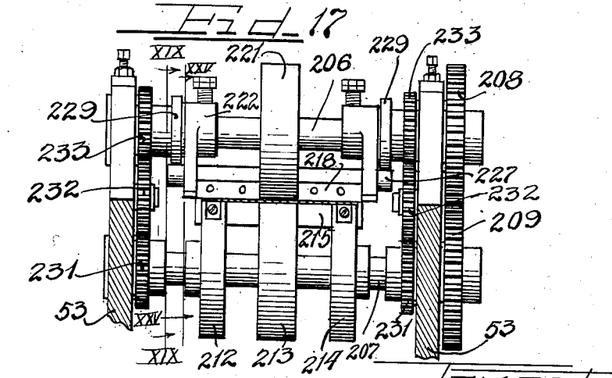
Figure 17 is a cross section through a portion of the apparatus shown in Figure 1, the section being taken on the line XVII—XVII and looking in the direction of the arrows.

In order to hold the paper up against the knife and to prevent the knife from merely pushing the paper to one side without piercing it, a shoe 145 is provided on the other side of the paper for backing it up. The shoe 145 is clamped by means of a screw 146 on a rod 147 extending across the machine, and the face of the shoe over which the paper passes is provided with a recess 148 into which the end of the knife that projects through the paper can swing. In order to more firmly hold the paper against the pressure of the knife 138 and to permit the successful cutting of thicker and stronger paper or of more plies of paper in making multi-ply bags, the recess 148 is divided into two parts by a central rib 149 set into a slot in the face of the shoe 145. The paper is thus supported at both sides of and at the center of the cut. The knife 138 is provided with a deep central notch in its cutting edge to allow it to straddle the rib 149 as it passes through the paper. The resulting cut, therefore, is divided into two parts 64a and 64b, as shown in Figure 16, the two parts of the cut being separated by a small unbroken section of paper corresponding to the deep central notch in the cutting edge of the knife 138.

The position of the cuts 64a and 64b across the width of the paper may be adjusted for different types of bags merely by adjusting the position of the cutting mechanism. This is readily accomplished by unloosening the set screws 142 on the collars 139 and 141 at each side of the collar and arm which carry the cutting knife and by loosening the screw 146 which serves to clamp the shoe to the rod 147 which supports it, and relocating these various parts at the proper point across the width of the machine so as to form the cuts in the desired position.

*Pasting mechanism for inside of diagonal fold*

Figure 1:
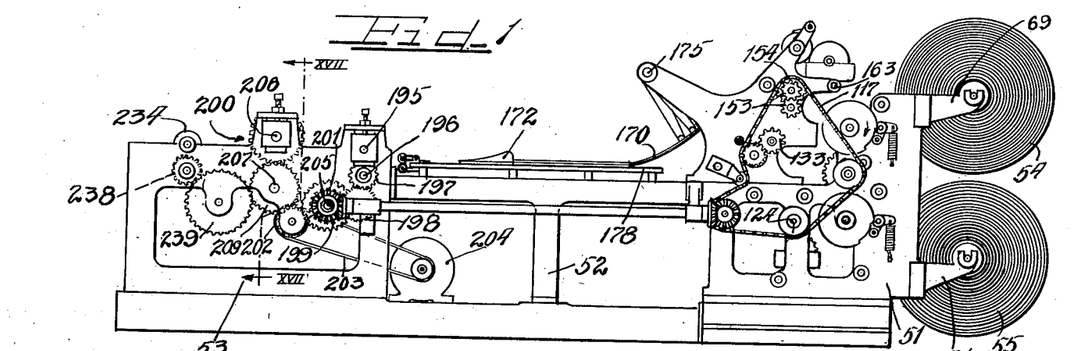
Figure 1 is a side elevational view of that portion of one of the preferred embodiments of the invention which differs from the standard bag making machine of the type shown in the Weber patent mentioned above.
Figures 2, 20:
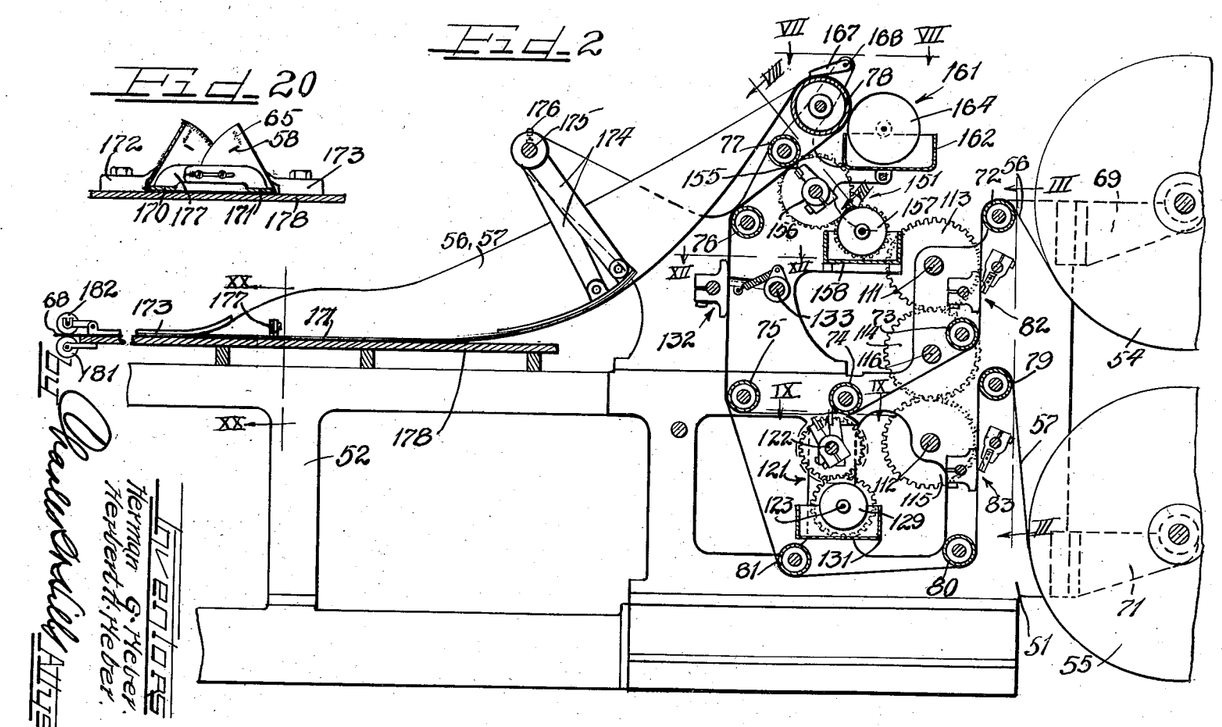
Figure 2 is a vertical longitudinal section through a portion of the apparatus shown in Figure 1.
Figure 20 (on the same sheet as Figure 2) is a cross section through a part of the machine shown in Figure 2, taken on the line XX—XX and looking in the direction of the arrows.
Figure 8:
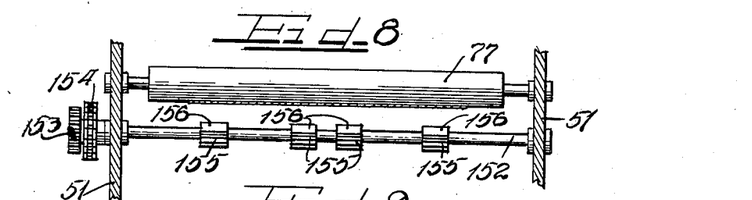
Figure 8 is a cross section through a portion of the apparatus shown in Figure 2 taken on the line VIII—VIII and looking in the direction of the arrows.
Figure 9:
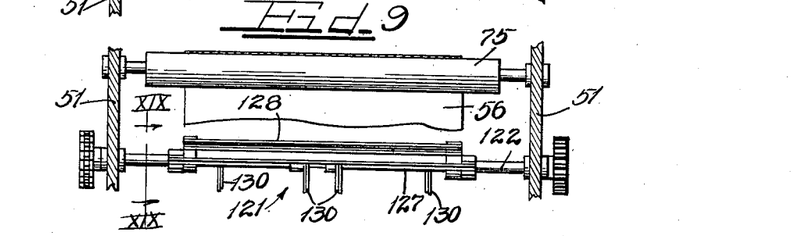
Figure 9 is a horizontal section through a portion of the apparatus shown in Figure 2, taken on the line IX—IX and looking down in the direction of the arrows.
Figure 10:
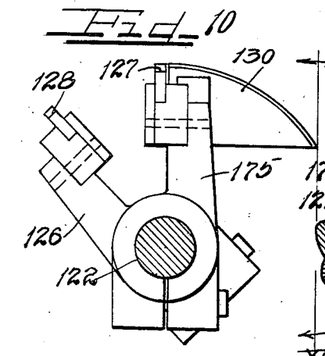
Figure 10 is a cross section on an enlarged scale of a part of the portion of the apparatus shown in Figure 9, taken on the line X—X and looking in the direction of the arrows.
Figure 11:
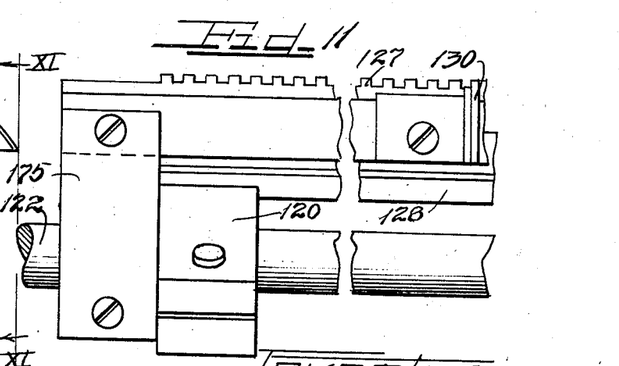
Figure 11, also on an enlarged scale, is a broken elevation of the portion of the apparatus shown in Figure 10 as seen from the line XI—XI and looking in the direction of the arrows.
Figure 12:
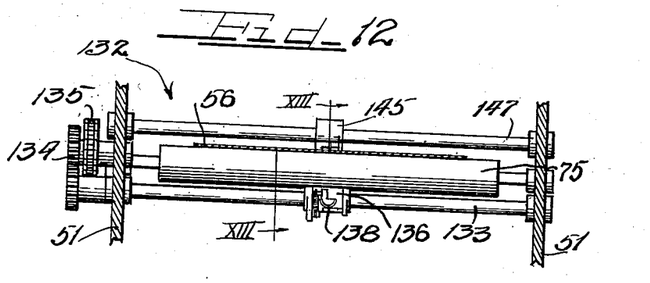
Figure 12 is a horizontal section showing a portion of the apparatus shown in Figure 2, the section being taken on the line XII—XII and looking down in the direction of the arrows.
Figure 13:
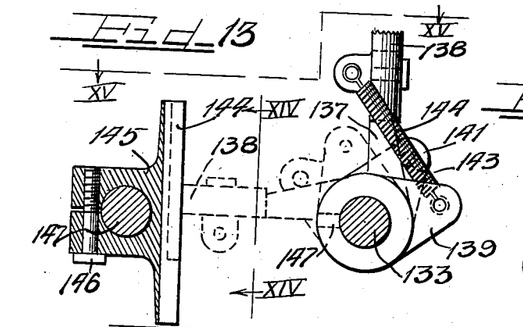
Figure 13 is a cross section, on an enlarged scale, of the portion of the apparatus shown in Figure 12, the section being taken on the line XIII—XIII and looking in the direction of the arrows.
Figure 14:
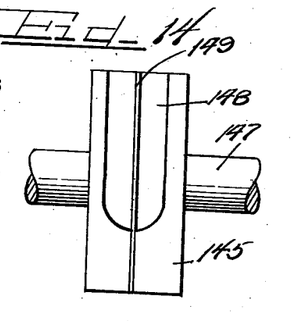
Figure 14 is an elevational view of part of the portion of the apparatus shown in Figure 13 as seen from the line XIV—XIV and looking in the direction of the arrows.
Figure 15:
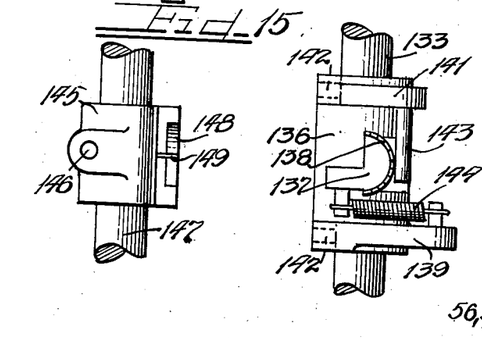
Figure 15 is a plan view of the portion of the apparatus shown in Figure 13 as seen from the line XV—XV and looking down in the direction of the arrows.

A mechanism 151 for applying the lines of paste 65, shown in Figure 26, on the side of the paper which is to form the inside of the bag and at a point where it will seal the diagonal fold in the bag bottom is located along the path of the paper a short distance beyond the mechanism 132 for making the thumb cut. The mechanism comprises a shaft 152 extending across the machine and journaled in bearings carried by the frame 51 and driven through gears 153 and a sprocket 154 from the drive chain 117 shown in Figure 1. As shown in Figures 2 and 8, the shaft 152 carries four paste applicators 155, each of which is secured to the shaft 152 by means of an arm 156, similar to the arm 125 in Figures 10 and 11, which can be clamped in any desired position along the length of the shaft 152. Thus, this portion of the machine can be adjusted for the production of bags of different sizes.

The paste applicators 155 are supplied with paste by means of a drum 157 which is located so that the paste applicators 155 press against its surface as they swing around on the shaft 152. The paste drum 157 is mounted on and revolved by the shaft which carries the sprocket 154 and its lower portion projects into a paste box 158 which keeps its surface covered with paste.

*Seam paster*

Figure 7:
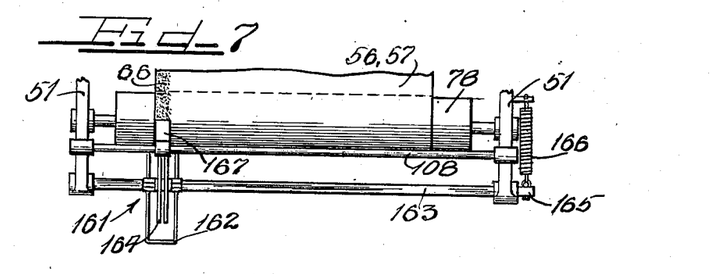
Figure 7 is a plan view of a portion of the apparatus shown in Figure 2 as seen from the line VII—VII and looking down in the direction of the arrows.

The last operation to be performed upon the paper before it is formed into a tube preparatory to being cut up into individual bag blanks is the application of paste along one edge of the sheet of paper so that the two edges of the paper will stick to each other when the paper is formed into the tube. This operation is performed by a seam paster 161 located adjacent to the last roller 78 over which the paper passes before going to the tube forming guides. As shown in Figures 2 and 7, the seam paster 161 comprises a paste box 162 carried on a square shaft 163 extending across the machine and having cylindrical ends journaled in the side frame 51. The paste box 162 carries a pair of paste applying wheels 164 which extend down into the paste box 162 and extend up far enough to engage the paper passing over the roller 78. In order to hold the paste wheels or discs 164 against the paper, means are provided for resiliently urging the shaft 163 to rotate toward the roller 78. This means comprises an upright lever 165 fixed to the end of the shaft 163 and a spring 166 secured to the outer end of the lever 165 and to the frame of the machine. Other equivalent means may of course be used, such as a horizontal arm carrying a weight at its end, or other forms of spring.

In order to insure that the paste applied to the paper by the paste wheels 164 will be applied evenly and continuously, a paste spreader 167 is mounted above the roller 78. The spreader 167 consists of an arm journaled on a rod 168 extending across the machine, the end of arm resting on top of the paper passing over the roll 78 and being held there by its own weight.

The paste spreader 167 is located transversely of the machine by a pair of collars 169, one at each side, which are fixed to the rod 168 by means of set screws. This allows the paste spreader 167 to be placed at any desired position across the machine in order to operate on different widths of paper for making different sizes of bags. The seam paster 161, which applies the paste on which the paste spreader 167 operates can also be adjusted laterally of the machine as it can be slid to any desired position along the square shaft 163 which carries it and secured at that position by means of set screws.

*Longitudinal folding mechanism*

The mechanism for forming the longitudinal folds in the paper and thus forming it into a tube ready to be cut into separate bag lengths comprises a group of stationary formers or guides through which the paper is drawn and which gradually fold it into the desired cross section as it is being drawn through them. In Figures 1, 2 and 20, the machine is shown with the formers 170, 171, 172 and 173 for producing a simple flat tube from which satchel bottom bags are made as shown in Figures 32 to 35. These formers comprise two inside formers 170 and 171, whose outer edges are spaced apart the width of the tube to be formed, and two outside formers 172 and 173 which fold the paper 56, 57 down over the inner formers.

The inner formers 170 and 171 are carried by arms 174 extending down from a shaft 175 positioned above and transverse to the path of the paper. The arms 174 are fixed to the shaft 175, and the shaft itself is fixed to the frame by set screws 176 so that the formers 170 and 171 can be spaced apart more or less for different sizes of bags or can be removed entirely to allow different types of formers, such as may be desirable for producing self-opening bags, to be put on the machine. If desired, the set screws 176 may be supplemented by keys and keyways for more positively preventing turning of the shaft 175 in the frame and turning of the support arms 174 on the shaft.

Means may be provided for maintaining at the proper distance apart the ends of the inner formers 170 and 171 which are remote from the support arms 174. This means may consist of one or more bridges 177 whose ends are secured to the upper surfaces of the formers 170 and 171 and which span the space between them. A construction of this general nature which does not touch the upper surface of the paper 56, 57 in the center of the space between the crease-forming outer edges of the formers is desirable in order to avoid smearing of the transverse lines of paste 65 which are applied to the upper surface of the paper when bags of the type having diagonal bottom folds sealed by paste are being made. In order to allow the two formers 170 and 171 to be spaced apart more or less, the bridge 177 may be made of two pieces which overlap and are secured together by bolts passing through slots in the two pieces.

The two outer formers 172 and 173 are secured to the top of a table 178 supported by the middle section 52 of the frame and extending underneath and beyond the inner formers 170 and 171. These formers are shaped so as to fold over and press the two sides of the paper 56, 57 over on top of the inner formers 170 and 171 as the paper is drawn through them. Adjustment of the outer formers 172 and 173 may be accomplished by bolting them to the table 178 at different distances apart or they may be entirely removed and different formers substituted. The formers are constructed or adjusted so that when the paper 56, 57 is folded over, the edges will overlap an amount just great enough so that the paste 66 applied along one edge of the paper will come above the other edge, thus sticking the two edges of the paper together and forming it into a tube. As the paper tube leaves the formers, it passes between a pair of rollers 181 and 182 which press the overlapping edges of the paper together and insure the making of a good seam.

Figures 22, 23:
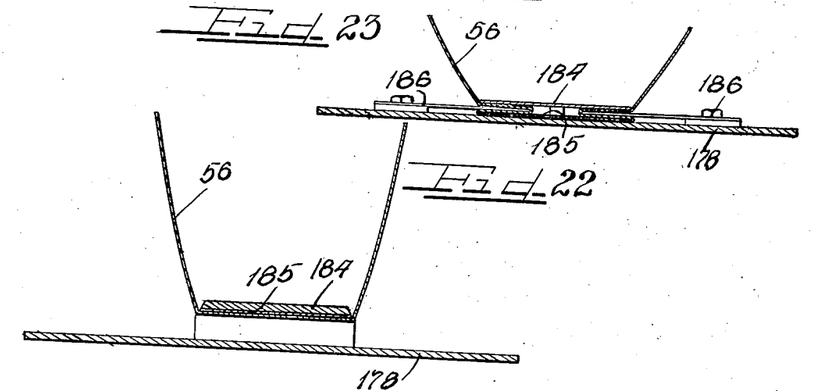
Figure 22 is a cross section on the line XXII—XXII of Figure 21 looking in the direction of the arrows.
Figure 23 is a cross section on the line XXIII—XXIII of Figure 21 looking in the direction of the arrows.

The arrangement of formers described above is used when the machine is set up for making satchel bottom bags. When the machine is set up for making self-opening bags, a different set of formers is required which will fold the paper into a tube having reentrant side folds or accordion pleats. The formers for producing a tube of this character are shown in Figures 21 to 24 and comprise upper and lower inner formers 184 and 185 which are arranged to be carried by the arms 174 from the shaft 175 extending across the machine above the path of the paper. The two inner formers 184 and 185 lie one above the other with a thin space between them into which the formers 186 for making the accordion pleats or folds project, as shown in Figure 23. The final folds in forming the accordion pleated tube for the self-opening bag are made by a pair of rollers 187 and 188 which are carried by brackets 189 and 191 near the end of the table 178 above which the formers are mounted. The two rollers 187 and 188 are placed so as to push the two sides of the paper down as they pass under the rollers and to cause one edge of the paper to overlap the other. After leaving the formers and the rollers which fold it into a tube, the paper passes between the two rollers 181 and 182 which press the overlapping edges of the paper together and finish the formation of the longitudinal seam.

The draw roll

A pair of draw rolls 193 and 194 are located immediately beyond the formers which shape the paper into a tube as described above. The draw rolls 193 and 194 serve to draw the paper through the entire preceding portion of the machine and are carried by a pair of shafts 195 and 196 mounted in a manner similar to that disclosed in the patent to H. G. Weber referred to above. The two draw roll shafts 195 and 196 are driven through gearing 197, 198, 199, 201 and 202 and a chain or belt 203 from a motor 204. The gear 198 which meshes with the gear 197 on the lower draw roll shaft 196 is arranged in a conventional manner so that it can be placed at different distances from the shaft 205 which carries the gears 199 and 201, thus allowing the gear 199 with which it meshes to be removed and replaced by gears of different sizes in order to vary the speed of the draw rolls. In this manner, the length of paper which is drawn through the machine for each cycle of operation can be varied thus varying the length of the bag which is to be produced.

The severing mechanism

Figures 18, 19:
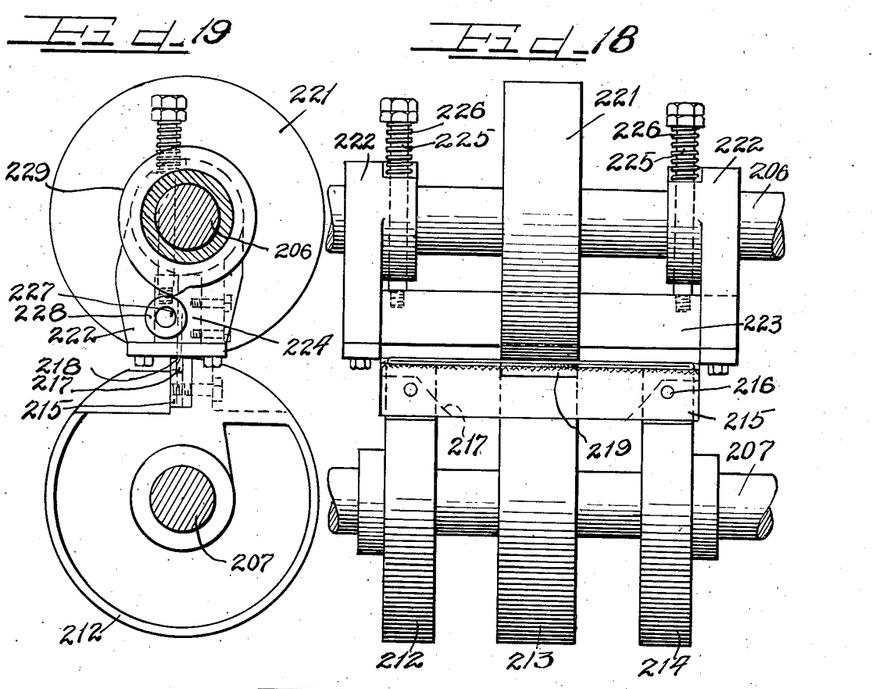
Figure 18 is a back view on an enlarged scale of the portion of the machine shown in the central portion of Figure 17.
Figure 19 is a section, on an enlarged scale, showing the central portion of the structure shown in Figure 17, the section being taken on the line XIX—XIX and looking in the direction of the arrows.
Figures 21, 24:
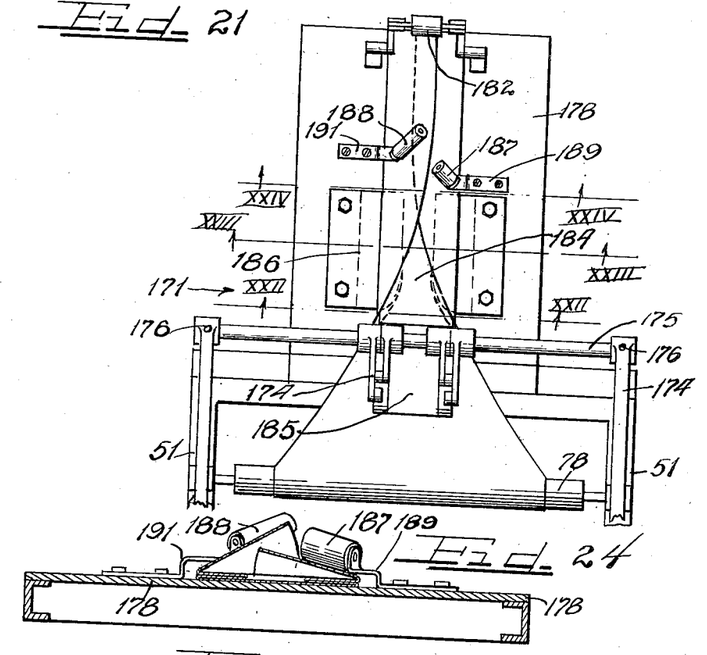
Figure 21 is a plan view of a modified form of a portion of the apparatus used in making self-opening bags.
Figure 24 is a cross section on the line XXIV-XXIV of Figure 21 looking in the direction of the arrows.

The severing mechanism 200 is placed just beyond the draw rolls 193 and 194 and comprises a pair of shafts 206 and 207 placed above and below the path of the paper tube coming from the draw rolls. The shafts 206 and 207 are geared together by a pair of gears 208 and 209 and are driven from the gear 202. The lower shaft 207 of the severing mechanism carries three rolls 212, 213 and 214 which carry the support 215 against which the paper is severed and which guide the paper through the severing mechanism. The paper support 215 is a rectangular bar extending across the three lower rolls 212, 213 and 214 and rigidly secured to the outer two of these by bolts 216. The top of the paper support 215 contains a deep groove 217 extending its entire length and into which the edge of the knife 218 which does the actual cutting of the paper can project. In the central part of the paper support 215, the groove 217 extends completely through and forms a slot as shown by the dotted line in Figure 18. Midway between the two ends of the paper support 215 one side of the groove or slot 217 is cut down as shown at 219 in Figure 18 in order to lessen the support given to the paper tube at the point where the thumb cut has previously been made so that the knife 218 will cut through only the upper layers or plies of paper at this point.

The upper shaft 206 carries a central roll 221 for guiding the paper through the severing mechanism and a pair of arms 222 having forked ends in which a knife carrier 223 is slidably mounted. The forked ends or slots in the arms 222 in which the knife carrier 223 slides are provided with gibs 224 which provide a means of adjustment for wear.

The knife carrier 223 is resiliently held against the inner ends of the slots in which it slides by means of a pair of rods 225 which can slide in holes extending through the hub of the arms 222 and provided with retracting springs 226. The knife 218 is thus normally held close enough to the shaft 206 so that it will not project into the groove 217 in the paper support.

Means are provided for suddenly projecting the knife 218 into the slot 217 of the paper support 215 when the knife and the paper support are directly in line with each other. This means comprises a pair of rollers 227 mounted on short shafts 228 at the ends of the knife carrier 223 and a pair of cams 229 rotatably mounted upon the shaft 226 alongside of the knife carrier support arms 222. The cams 229 are driven by means of trains of gears 231, 232 and 233 from the lower shaft 207 and turn in the direction contrary to the direction of rotation of the upper shaft 206 upon which they are mounted. Thus the speed of rotation of the cams 229 relative to the rollers 227 upon which they act is twice as great as the speed with which the rollers 227 revolve around the shaft 206, and a very fast downward movement of the knife carrier 223 and knife 218 can be obtained.

The transfer roll

Figure 25:
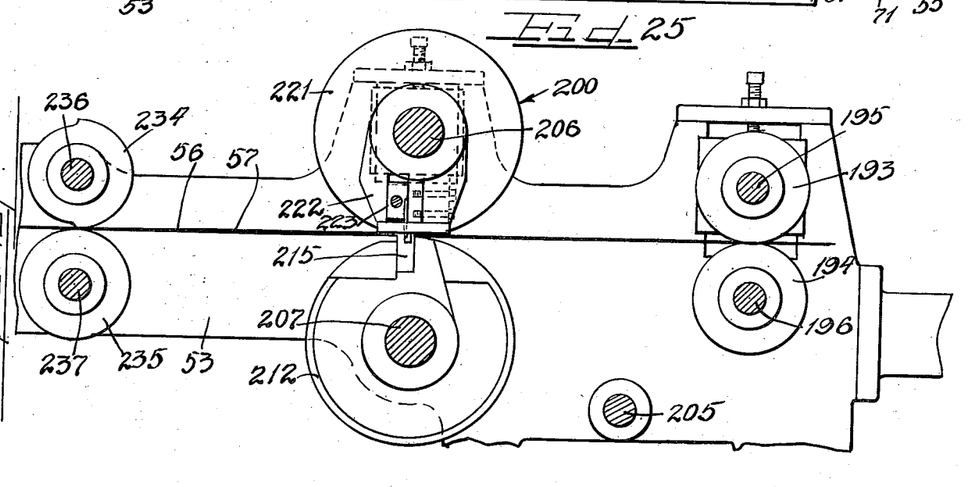
Figure 25 (on the same sheet as Figure 1) is a cross section on the line XXV—XXV of Figure 17, looking in the direction of the arrows.

In order that the severing mechanism just described may operate properly, it is essential that the paper about to be cut be stretched tightly across the paper support 215. In order to accomplish this, a pair of transfer rolls 234 and 235 are placed just beyond the severing mechanism 200. These rolls are mounted upon shafts 236 and 237 and are driven by means of gears 238 and 239 from the gear 211 upon the lower shaft 207 of the severing mechanism. The transfer rolls 234 and 235 may be made to rotate at the same peripheral speed as the severing mechanism and the draw rolls 193 and 194, but it is preferable to arrange the ratios of the gears 238 and 239 driving the transfer rolls so that these rolls have a peripheral speed slightly greater than the peripheral speed of the severing mechanism and also slightly greater than the greatest peripheral speed of the draw rolls, it being remembered, of course, that the peripheral speed of the draw rolls 193 and 194 may be varied according to the length of bag which is to be made by changing the size of the gear 199. In order to prevent too much pulling of the paper 57 by the transfer rolls 234 and 235 while the paper is held by the draw rolls 193 and 194 and before it is cut by the knife 218, the upper transfer roll 234 has a portion of its periphery cut away, as shown in Figure 25, so that, during a portion of the time, the transfer rolls do not grip the paper. The gearing of the transfer rolls is timed so that they grip the paper 57 just before the knife 218 is pushed down by the cams 229. The transfer rolls then pull the paper 57 tight across the paper support bar 215 so that, as the knife moves down, its serrated edge will pierce the paper and cut it across its entire width instead of merely pushing it down without cutting it. One portion of the paper 57, however, has been previously cut by the thumb cut device described above so that the cut produced by the knife in the lower layer of paper which contains the thumb cut extends only from the ends of the thumb cut to the edges of the paper. The making of an additional cut across the thumb cut is prevented by the notch or cut-away place 219 on one side of the paper support.

Figures 29, 30, 31, 32, 33, 34, 35:
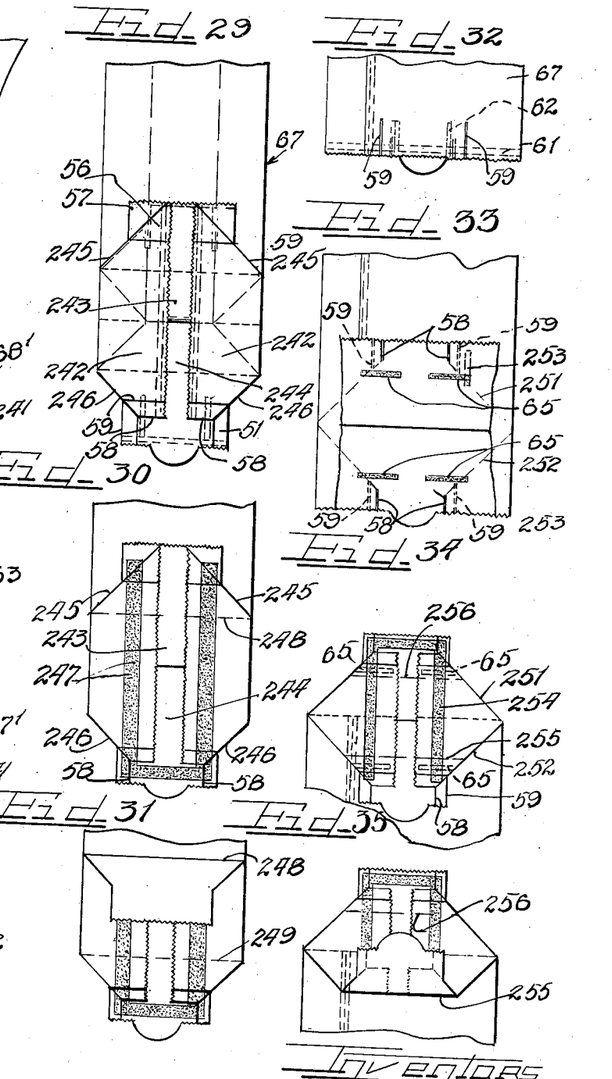
Figures 29, 30 and 31 show successive steps in the folding and the pasting of the bottom of a self-opening bag formed from the blank shown in Figure 28.
Figures 32 to 35 show successive steps in the folding and pasting of the bottom of a satchel-bottom bag formed from a flat paper tube without side folds.
Figure 36:
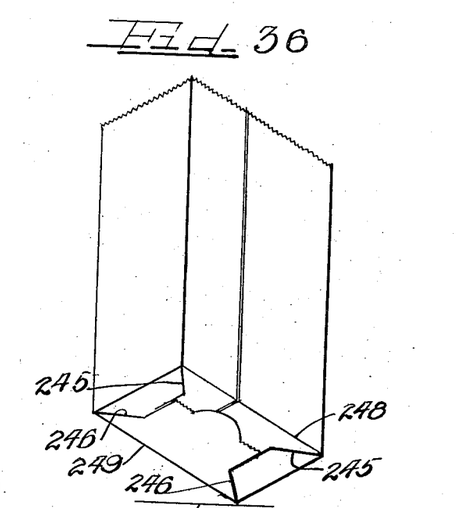
Figure 36 is an isometric view of a completed bag, showing the appearance of the finished bottom.

The various portions of the entire machine are synchronized and adjusted so that the cut made by the severing mechanism joins up with the cut made by the thumb cut device. The slits 58 and 59 extend just to the cut made by the severing mechanism as shown in Figures 28 and 32 or, in the case of bags whose upper ends are to be folded in and sealed in a way similar to that employed for making the bottom of the bag, the cut 59 extends an equal distance on each side of the cut made by the severing mechanism. The lines of paste 61 and 63 applied by the inter-ply pasting mechanism 121 lie on the two sides of the cut made by the severing mechanism so that the two plies of a bag will be pasted to each other at each end of the blank. Thus the blank which is produced by the portion of the machine which has been described is ready to be formed into a complete bag by the folding mechanism, to which the blank is fed by the transfer rolls 234 and 235.

The folding mechanism may be of any standard type for producing the type of bottom desired. Since this portion of the complete machine is standard, it need not be described or illustrated as its construction and operation are well known in the art.

*Subsequent operations*

Although the construction and operation of the folding mechanism which folds one end of the bag blank to form a bag bottom is too well known to merit description, it may be desirable to briefly point out the result of performing the standard folding operation on a blank produced in the machine described above.

Figures 28 to 31 and 36 show the result of these operations in making a self-opening bag. Figure 28 shows the completed bag blank 67' after it has been severed from the end of the tube 68', the tube at this stage being of the type having the portions which are to form the narrow sides of the future bag folded in as accordion pleats, as shown by the dotted lines 241. When the blank 67' enters the folding mechanism, the upper side is folded back at one end as shown in Figure 29. The ends of the accordion pleats 241 are opened out and folded in, as shown at 242, over the inner surface of the folded back part 243 of the upper side of the paper tube and over the portion of the inner surface of the lower side 244 which is exposed by the folding back of the upper side 243.

When the ends 242 of the accordion pleats are folded in as shown in Figure 29, the folded back part 243 of the upper side of the tube and the projecting portion 244 of the lower side of the tube will be folded in along diagonal folds 245 and 246. In the outer ply of paper 57, these diagonal folds 245 and 246 will extend in only to the longitudinal slits 59 but they will extend in further than this in the inner ply 56. In the inner ply 56, the diagonal folds may extend all the way to the edge of the paper or they may terminate at slits which are placed further in than the slits 59 in the outer ply. In the particular example shown, the diagonal fold 245 in the inner ply of the upper side of the tube, which is folded back, extends the full distance to the edge of the paper, whereas the diagonal fold 246 in the inner ply 56 of the under side of the paper tube terminates at the slits 58.

After the end of the paper tube has been opened out and folded down as shown in Figure 29, a U-shaped line of paste 247 is applied to it as shown in Figure 30. It is especially important that the line of paste 247 extends across at least a part of the ends of the diagonal folds 246 in the inner ply on that side of the opened out end of the tube which is to receive the closed end of the U-shaped line of paste 247. This is accomplished by placing the slits 58 in the inner ply so that they will either cross or terminate in the U-shaped line of paste 247 at or near the corners of the U.

It is also important that the two legs of the U-shaped line of paste 247 either cross the diagonal folds 245 in the inner ply adjacent to the open end of the U or, if they do not reach the diagonal folds 245, be far enough apart so that they would cross them if extended.

These requirements are met by placing the slits 58 in the inner ply so that they will either cross the line of paste 247 or terminate within it near the closed end of the U and by either providing no slits in the inner ply near the open end of the U or by placing these slits closer together than the overall width of the U.

After the paste 247 has been applied, the folded back part 243 of the upper side of the paper tube is folded forward on the transverse line 248 giving the result shown in Figure 31. The lower part of the tube is then folded up along the line 249 in Figure 31 and pressed down over the portion which was folded forward on the line 248. This finishes the formation of the bottom of the bag and gives the result shown in Figure 36, which shows the bag opened and ready to be used.

It may be noted from a study of Figures 30 and 31 that the ends of the diagonal folds 245 and 246 in the outer ply terminate short of the line of paste 247 and that, if the inner ply were not present, a powdered material in the bag could sift along these folds and escape between the ends of the folds and the lines of paste. It should also be noted that the same sifting along the diagonal folds could occur even with the inner ply present if the inner ply were slit along the same line as the outer ply. Such sifting is prevented by extending the diagonal fold in the inner ply beyond the end of the diagonal fold in the outer ply and thus bringing the end of the diagonal fold either to a point where it will be covered with paste or to a point where it will lie entirely within the bottom of the bag. In either case, the escape of finely powdered material to the outside of the bag will be prevented.

In Figures 32 to 35, there are shown the successive steps in the folding of the bottom of a two-ply satchel bottom bag of the type having the diagonal folds sealed by paste within them and also sealed by having the inner ply of the diagonal folds extending beyond the end of the outer ply. At the end of the bag blank 67, as shown in Figure 32, the two plies are pasted together by a circumferential inter-ply line of paste 61. The outer ply is slit a short distance in from the end at 59 and the inner ply is also slit at 58, these slits being arranged in pairs on the upper and lower sides of the blank and the slits 59 in the outer ply being spaced further apart than the slits 58 in the inner ply. The two plies are also pasted together alongside of the slits 58 by short lines of paste 62.

The inside of the blank is also provided with transverse lines of paste 65, as shown in Figure 33 in which the upper side of the blank is torn back to more clearly show these lines of paste. It should be noted that the lines of paste 65 extend across the lines 251 and 252 along which the diagonal folds of the bottom are to be made. It is not necessary, however, that the lines of paste 65 be placed transversely as shown for they may be placed longitudinally as indicated by the dotted outline 253.

When the upper and lower sides of the bag blank are spread apart and folded in along the diagonal folds 251 and 252, as shown in Figure 34, the lines of paste 65 will cause the overlapping folded portions to adhere to each other and block the possible passage of fine powdered material along the diagonal folds 251 and 252.

A U-shaped line of paste 254 is then applied as shown in Figure 34 and the paper is folded in along the lines 255 and 256 to produce the finished bag bottom. The appearance of the bag bottom before the last fold is made on the line 256 is shown in Figure 35 and the completed bag, when opened, is quite similar in appearance to the bag shown in Figure 36.

While only two forms of bags have been shown and described above, the machine and process are obviously able to produce other forms of bags. For example, the self-opening bag whose formation is shown in Figures 28 to 31 may have the inner ply provided with four slits 58 in the same way as the satchel bottom bag whose formation is shown in Figures 32 to 35. Similarly, the inner ply of the satchel bottom bag may be provided with only two of the four slits 58 in the same manner as the self-opening bag shown in Figures 28 to 31.

The particular type of satchel bottom bag whose formation has been described and shown in Figures 32 to 35 is doubly sift-proof in that the diagonal folds 251 and 252 are sealed both by the lines of paste 65 within them and by the fact that the inner ply of these folds extends beyond and is sealed by the outer ply. This not only makes a bag whose bottom is extremely sift-proof, but it greatly increases the strength of the bottom. However, in most cases, either one or the other of the means for making the bottom sift-proof may be used alone. For example, the slits 58 and 59 in the two plies may be located relative to each other as shown and the lines of paste 65 within the diagonal folds may be omitted or the slits 58 in the inner ply may be made coincident with the slits 59 in the outer ply, reliance in this case being placed upon the lines of paste 65 within the diagonal folds for making the bags sift-proof. The bag, if desired, may be made of a single ply of paper, in which case there would be only a single set of slits 59 and the lines of paste 65 in the diagonal folds would make the bag sift-proof.

The bags which have thus far been described as being made by the machine which forms the preferred embodiment of the present invention all have their upper ends perfectly plain except for the thumb cut. In some cases it is desirable to provide a bag whose upper end can be folded and sealed in the same way as the bottom, and this requires that the top of the bag blank be provided with slits similar to the slits 58 and 59 at the bottom. This is readily accomplished by adjusting the cams 93, 106 of the slitting mechanism so that the slits extend across the line of separation between two successive blanks and provide slits for forming the bottom of one bag and for the top of the next bag.

The form of the machine shown in the drawings and described above is, of course, only one of the preferred embodiments of the invention and it is to be understood that many modifications may be made without departing from the broad spirit of the invention as defined by the appended claims. For example, other types of devices for applying paste to or for slitting the paper may be substituted for those shown. One specific example of such a substitution that might be made would be the replacing of the reciprocating type of slitting mechanism 82 and 83 shown in the drawings by a rotary type of slitting mechanism such as is shown in the patent to H. G. Weber No. 1,571,983.

While the invention has been described in connection with the making of a two-ply sift-proof paper bag, it is equally applicable to the making of bags having three or more plies. In the making of such bags, two or more of the plies may be treated together as one ply and slit together or each ply may be treated separately in a machine having three or more separate slitting devices. The construction of such a machine will be obvious in the light of the previous description and need not be described.

We claim as our invention:

1. In the process of making paper bag blanks, the steps of moving a web of paper along a predetermined path, supporting the paper web on one side at a fixed place along said path at each side of and on a line along the center of a predetermined area of said paper web, applying highly localized pressure to said paper web in said area along two portions of an arcuate line on the paper web at the two sides of said central line of support in said predetermined area, said pressure being sufficient to rupture said paper web all along said arcuate line except where said web crosses said central line of support, and subsequently applying sufficient tension to said paper to rupture the portion of said web remaining between said two portions of said arcuate line.

2. In a mechanism for making paper bag blanks including means for moving a continuous web of paper along a predetermined path, means for making thumb cuts in said web comprising a knife having a cutting edge divided into two parts by a gap, means for supporting and swinging said knife in the direction of motion of the paper at a speed less than that of the paper and for permitting said knife to be carried along by the paper, said supporting and swinging means being placed so that the path of said cutting edge passes through the path of said paper, and means for preventing the paper from being pushed out of its path by the knife comprising a supporting surface at each side of the path of the knife and a narrow elongated supporting surface placed so as to lie in the gap between said two parts of said cutting edge when said knife passes through the path of said paper.

3. In a mechanism for forming paper bag blanks, means for severing a strip of paper into separate lengths comprising means for moving said paper strip along a predetermined path, a pair of shafts extending across at either side of said path, a knife carried by one of said shafts, a paper support carried by the other of said shafts, means for revolving said knife and said paper support around said shafts into cooperating relationship, and means for moving said knife away from its carrying shaft to sever said paper strips during such cooperating relationship, said knife moving means including a cam rotating in a direction opposite to the direction of revolution of said knife and a cam follower revolving with said knife and cooperating with said cam.

4. In a mechanism for forming paper bag blanks, means for severing a strip of paper into separate lengths comprising means for moving said paper strip along a predetermined path, a shaft extending across and spaced from said path, a knife carried by said shaft so as to revolve therewith and be radially movable with respect thereto, means for rotating said shaft so that the circumferential speed of the knife is approximately equal to the linear speed of said paper strip, cams rotatably mounted on said shaft, cam followers connected to the knife and cooperating with said cams to project the knife away from said shaft, and means for rotating said cams in the direction opposite to that of said shaft.

5. In a mechanism for forming paper bag blanks, means for severing a strip of paper into separate lengths comprising means for moving said paper strip along a predetermined path, a shaft extending across and spaced from said path, a pair of radial guides fixed to said shaft, a knife carrier slidably mounted in said guides, a knife fixed to said carrier, springs for holding said carrier towards said shaft, cams rotatably mounted on said shaft beside said guides, cam followers on the ends of said knife carrier and engaging said cams, and means to rotate said shaft and said cams in opposite directions at the same speed, said cams being shaped to rapidly project the edge of said knife through the path of said paper as said knife revolves into a position close to said path.

6. In a machine of the class described, a thumb cutting device comprising a semi-cylindrical member having a serrated cutting edge divided into two parts with a gap therebetween and a cooperating member having a narrow rib adapted to coincide with said gap during the thumb cutting operation.

HERMAN G. WEBER.
HERBERT H. WEBER.